US011110946B2

(12) United States Patent
Salvucci, Jr.

(10) Patent No.: US 11,110,946 B2
(45) Date of Patent: Sep. 7, 2021

(54) HANDCART

(71) Applicant: Frank Salvucci, Jr., Simi Valley, CA (US)

(72) Inventor: Frank Salvucci, Jr., Simi Valley, CA (US)

(*) Notice: Subject to any disclaimer, the term of this patent is extended or adjusted under 35 U.S.C. 154(b) by 0 days.

(21) Appl. No.: 16/992,753

(22) Filed: Aug. 13, 2020

(65) Prior Publication Data
US 2021/0046962 A1 Feb. 18, 2021

Related U.S. Application Data

(60) Provisional application No. 62/885,959, filed on Aug. 13, 2019.

(51) Int. Cl.
*B62B 3/00* (2006.01)

(52) U.S. Cl.
CPC ..................... *B62B 3/00* (2013.01)

(58) Field of Classification Search
CPC ..... B62B 2202/022; B62B 3/104; B62B 1/12; B62B 2202/22; B62B 2202/50; B62B 2202/90; B62B 2207/02; B62B 3/04; B62B 3/10; B62B 3/106; B62B 5/087; B62B 1/04; B62B 3/00
USPC ...................................... 280/47.34
See application file for complete search history.

(56) References Cited

U.S. PATENT DOCUMENTS

| 1,542,327 A | 6/1925 | Slingsby |
| 2,733,930 A * | 2/1956 | Putterman ............... B62B 3/106 280/641 |
| 3,057,579 A | 12/1974 | Hoodenpyle |
| 3,977,602 A | 8/1976 | Kirch |
| 4,358,124 A * | 11/1982 | Geschwender ......... E06C 1/397 280/47.18 |
| 5,113,546 A | 5/1992 | Parent |
| 6,059,127 A | 5/2000 | Bennett |
| 6,109,625 A | 8/2000 | Hewitt |
| 6,223,691 B1 | 5/2001 | Beattie |
| 6,348,048 B1 | 4/2002 | Womble et al. |
| D473,989 S | 4/2003 | Hittle |
| D473,990 S | 4/2003 | Hittle |
| 6,619,065 B1 * | 9/2003 | Burton ..................... B25H 3/00 62/149 |
| 7,252,297 B1 | 8/2007 | Barritt et al. |
| 7,357,398 B2 | 4/2008 | O'Connor |
| D570,068 S | 5/2008 | Dukes |
| 7,374,185 B1 | 5/2008 | Hollis |
| 7,661,683 B2 | 2/2010 | Fernandez |

(Continued)

*Primary Examiner* — James A Shriver, II
*Assistant Examiner* — Hilary L Johns
(74) *Attorney, Agent, or Firm* — Nath, Goldberg & Meyer; Richard C. Litman

(57) ABSTRACT

The handcart has a pair of larger wheels at the back of the load-carrying platform and a rear axle located above the plane of at least the forward portion of the platform. Smaller caster wheels are mounted on the lower portions of the super structure of the cart. The caster wheels extend longitudinally forward from the forward corners of the platform. The lower portions of the super structure and the caster wheel are attached to the platform by gusset plates or arms. The gusset plates or arms may be welded to the platform and the lower portions at an acute angle relative to the upper surface of the platform.

4 Claims, 2 Drawing Sheets

(56) References Cited

U.S. PATENT DOCUMENTS

| | | | |
|---|---|---|---|
| 8,087,679 B1* | 1/2012 | Salvucci, Jr. | B62B 3/04 280/47.35 |
| 2002/0014753 A1 | 2/2002 | Cheng | |
| 2005/0161416 A1* | 7/2005 | Anderson | A47B 46/00 211/85.7 |
| 2006/0191072 A1* | 8/2006 | Hempker | A61G 13/10 5/600 |
| 2008/0191437 A1 | 8/2008 | Staub | |
| 2008/0197592 A1 | 8/2008 | Dukes | |
| 2009/0152826 A1 | 6/2009 | Silva et al. | |
| 2009/0309329 A1* | 12/2009 | Davison | B60P 3/07 280/418 |
| 2011/0121530 A1* | 5/2011 | Young | B62B 3/10 280/47.35 |
| 2012/0074665 A1* | 3/2012 | Salvucci, Jr. | B62B 3/104 280/47.24 |
| 2017/0113826 A1* | 4/2017 | Ristoski | B65B 67/1233 |
| 2018/0354471 A1* | 12/2018 | Di Biase | B60S 9/18 |

* cited by examiner

HANDCART

CROSS REFERENCE TO RELATED APPLICATIONS

This application claims the benefit of Provisional Application 62/885,959, filed Aug. 13, 2019, titled Handcart.

BACKGROUND OF THE INVENTION

1. Field of the Invention

The present invention relates generally to carts, and more specifically, to a handcart having forward casters that are longitudinally or laterally offset outwardly from the forward corners of the platform for greater stability, and are further vertically offset upward to allow the platform to be as low as possible above the underlying surface.

2. Description of the Related Art

Handcarts, hand trucks, and similar manually operated conveyances have been known and used for a considerable period of time to facilitate the transport of limited loads over limited distances and terrain. Examples of such usage are the movement and positioning of heavy articles of furniture and appliances from a motorized truck to a home or office, the delivery of heavy paper goods (copier supplies, books, etc.) to home or office, etc.

Such carts are also often specialized for use in the storage and transport of cylinders of compressed gas, e.g., oxygen and acetylene cylinders for oxyacetylene welding, etc. Such carts conventionally have a pair of relatively large diameter, non-steerable wheels at the rear of their load platforms, with the axle raised to allow the load-carrying platform to rest on the surface when the platform is horizontal and the cart and contents are upright. This greatly facilitates the movement of cylinders (or other articles) on and off the platform, but requires that the cart be tilted rearward to raise the platform above the surface for movement by means of the rear wheels. A person moving the cart must not only provide the energy required for moving the cart, but must also maintain the angle of the cart in order to at least approximately balance the load on the rear wheels. This can be tricky when the cart must be moved over rough or uneven surfaces, and a wheel catches momentarily on some discontinuity in the surface.

As a result, a number of handcarts have been constructed with a smaller caster wheel beneath each of the front corners of the platform. The installation of the caster wheels beneath the platform obviously raises the platform above the supporting surface to a height at least slightly greater than the diameters of the casters. While the casters are usually of relatively small diameter, i.e., only a very few inches, this positioning of the platform some distance above the underlying surface can make it quite difficult to load or unload a very heavy object onto or from the platform.

None of the above inventions and patents, taken either singly or in combination, is seen to describe the instant invention as claimed. Thus, a handcart solving the aforementioned problems is desired.

SUMMARY OF THE INVENTION

The handcart comprises a lower portion including a platform having a pair of large diameter rearwardly disposed wheels having their axle located above at least the lowermost portion of the load-carrying platform. A smaller diameter caster wheel is mounted on the lower portion of the handle super structure forwardly from each forward corner of the platform. The lower portion of the super structure is supported by a gusset attached to the platform at one end and secured to the lower portion at its opposite end. The outboard ends of the gusset are displaced upwardly from the plane of the load-carrying platform, thus placing the bottom of the load-carrying platform barely above the bottoms of the wheels. This configuration allows articles to be loaded onto and unloaded from the platform without undue effort, and also allows the cart to be moved without needing to tilt the cart back and balance the load on the rear wheels. The forward placement of the smaller casters also greatly increases stability in comparison to such smaller wheels located beneath the platform, as in many other carts. Brakes may be provided on the casters, if so desired.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The handcart described herein comprises a four-wheeled handcart having a lower, load-carrying platform positioned between the wheels in order to place the platform only a very slight distance above the underlying surface. This allows various bulky and/or heavy articles, e.g., pressurized cylinders of oxygen and acetylene for welding, etc., to be placed upon and removed from the cart without requiring them to be lifted to any great degree. Moreover, the cart may be moved without need to tilt it rearward, as is the case with conventional carts, wherein the platform rests directly upon the underlying surface when the cart is upright.

Many of the features described herein are similar to those described in Applicant's previous patents, their disclosure being incorporated herein: U.S. Pat. Nos. 8,087,679 B1, 8,167,323 B1, and 8,172,241 B2.

Figure 1:
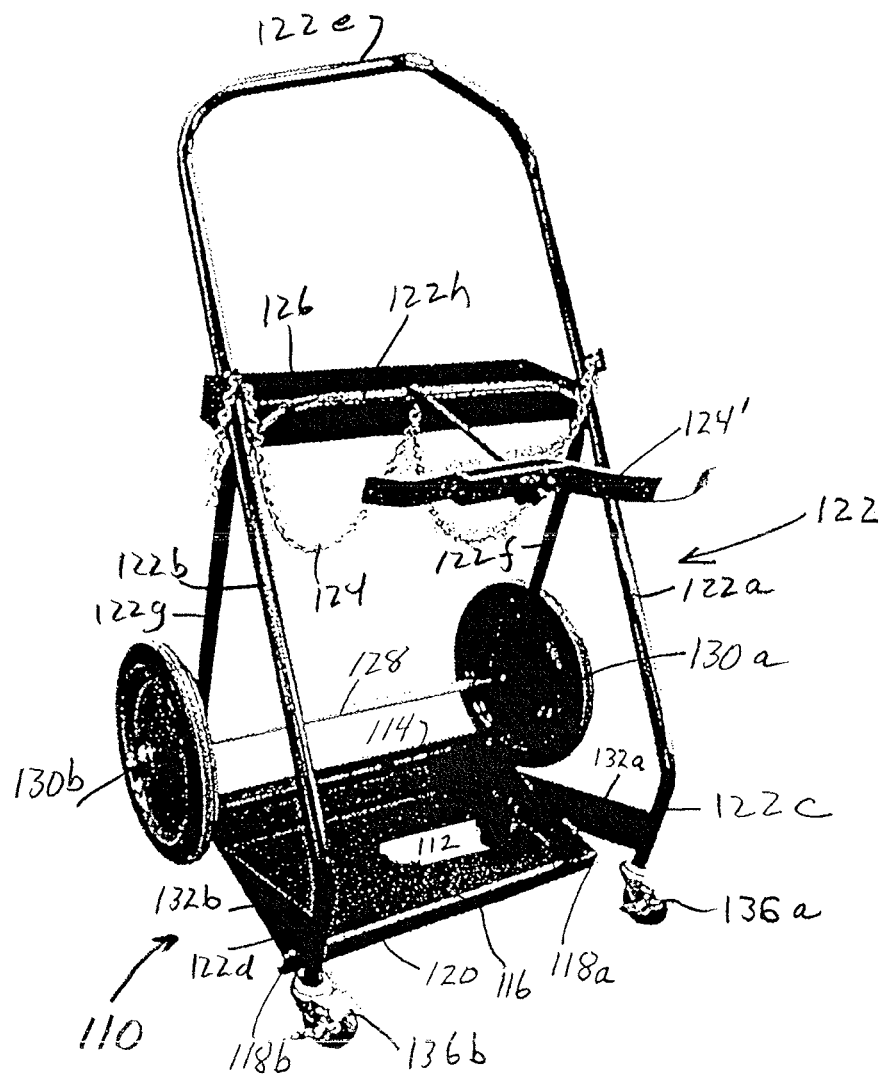
FIG. 1 is a perspective view of a handcart according to the present invention, shown from the right front and illustrating various details thereof.

FIG. 1 provides a perspective view of the handcart 110. The handcart or cart 110 is adapted or configured particularly for the carriage of pressurized cylinders thereon, e.g., welding cylinders, but it will be understood that the cart 110 may be readily adapted for the carriage of other articles or objects as well, if desired. The cart 110 includes a flat, planar load-carrying platform 112 formed of a relatively thin and unbroken sheet of metal or other suitable material. The platform 112 includes a rear portion 114, an opposite forward portion 116, a left front corner 118a, and a right front corner 118b. The periphery of the platform includes a downwardly bent lower flange or edge 120 serving to stiffen the platform structure. It is recognized that the bent lower flange or edge 120 may be formed only at the forward portion 116 and/or the rear portion 114 rather than about the entire periphery of the platform 112.

A superstructure 122 extends upwardly from the platform 112 and includes forwardly disposed left and right members 122a and 122b that terminate in straight lower portions 122c and 122d longitudinally forward of the left 118a and right 118b corners of the platform 112, with a rearwardly disposed handle 122e joining the upper ends of the two members 122a, 122b. Similarly configured (but shorter) left and right rear members, respectively 122f and 122g, extend upwardly from the rear corners of the platform 112 and are joined by a crossmember 122h that extends generally medially across the two forward members 122a, 122b. The various components 122a through 122h may be formed of tubular steel material, or may alternatively be formed of other structural material as desired. Additional structure may be provided, e.g., cylinder retaining chains 124 and band 124', an accessory tray 126 for holding a striker, different welding tips and/or tip cleaning tools, etc., as desired.

A rear axle 128 extends laterally across the two rear members 122f and 122g of the superstructure 122. Large diameter left and right rear wheels, respectively 130a and 130b, extend from the respective ends of the axle 128 and immediately outboard the sides of the platform 112. The two rear wheels 130a, 130b are directionally fixed, i.e., they are not steerable relative to the remainder of the structure of the handcart 110. The rear axle 128 is located somewhat above the plane of the load-carrying platform 112. The rear axle 128 is located vertically so as to position the platform 112, or more specifically the lowermost edges of the downwardly folded lower flange 120 thereof, very close to the underlying surface when the rear wheels 130a, 130b and the smaller diameter forward casters (discussed further below) are resting upon that surface.

Figure 2:
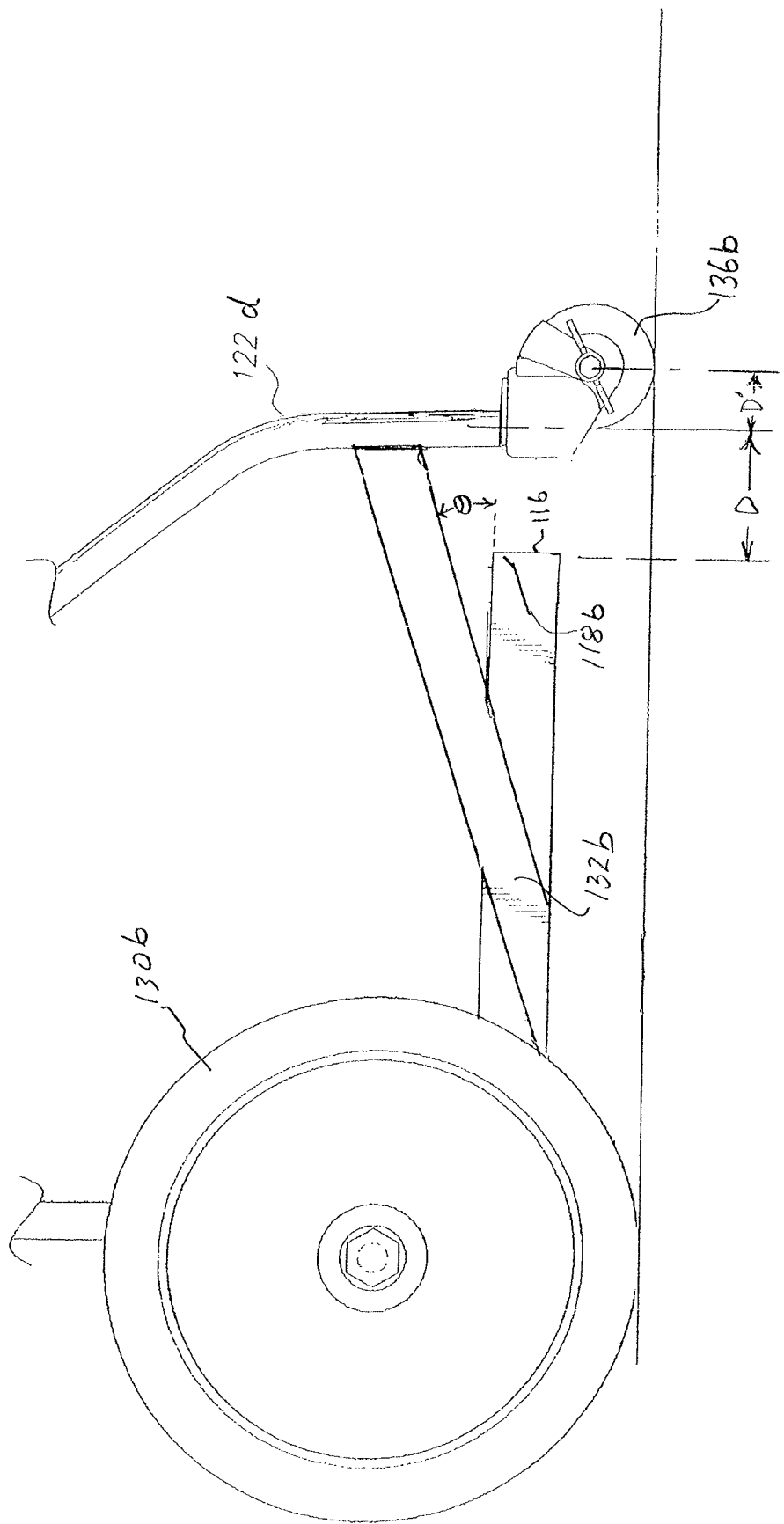
FIG. 2 is a partial right side elevation view of the handcart wherein the gusset plate is shown attached to the platform at one end and the lower portion of the superstructure at its other end thereby locating the caster wheel in front of the platform.

As seen in FIGS. 1 and 2, left and right gusset arms or plates, respectively 132a and 132b, extend forwardly from the respective left and right sides and front corners 118a and 118b of the platform 112. The two arms or plates 132a, 132b are preferably welded to the side edges of the platform and extend upwardly at an acute angle $\Theta$ to engage the lower portion of the super structure 122c and 122d, wherein it is welded thereto. Although welding is the preferred attachment, it is recognized that mechanical fasteners (e.g. bolts) may be used. Although the gusset arms or plates may vary in size and configuration, a 3 inch wide and 3/16" thick plate is contemplated. The length of the gusset plate or arm is determined by how far forward D of the forward portion 116 is desired. A preferable dimension would extend the gusset plate or arm 4 inches forward of the forward portion 116.

Although the figures shows the gusset plate or arm as being a straight member, it is within the realm of the invention to form the plate or arm with two distinct portions. That is, a straight portion attached to the side edges of the platform and a bent forward portion for attachment to the lower portion of the super structure 122c and 122d forwardly and laterally outwardly at an acute angle from their respective platform forward corners 118a and 118b. In this embodiment the left and right members 122a and 122b of the super structure 122 will diverge to meet the angled portion of the gusset plate or arm.

Small diameter left and right caster wheels, respectively 136a and 136b, depend from the lower ends of the lower portion of the super structure 122c and 122d. The radius D' of the caster wheels will be accommodated by the distance D provided by the gusset plate 132a and 132b.

The dimensional relationship between the caster wheels, rear wheels and platform are similar to that described in Applicant's previous patents. For example, as disclosed in Applicant's U.S. Pat. No. 8,172,241 B2, even though the caster wheels are of relatively small diameter, i.e., considerably smaller than the larger diameter rear wheels, it will be seen that their diameter is greater than the height of the depending lower edge 120 of the platform 112. Accordingly, the vertical offset of the two caster arms 132a, 132b is sufficient to position the axle of the caster 136b shown in FIG. 5 of said patent, above the lowermost edge of the depending lower edge 120 of the platform 112. Along with the raised rear axle 128, this results in a clearance C between the lowermost edge of the lower flange 120 of the platform 112 of only a small fraction of an inch, more or less. The vertical location of the rear axle 128 in combination with the vertical offsets of the two caster wheel arms 132a and 132b, results in the platform 112 being substantially parallel to the underlying surface when all four wheels 130a, 130b, 136a, and 136b are resting on the underlying surface, as shown in FIG. 5 of said patent. The wheels 136a, 136b may be equipped with conventional toggle lever type brakes.

The dimensional relationship between the caster wheels, rear wheels and platform are similar to that described in Applicant's previous patents. For example, as disclosed in Applicant's U.S. Pat. Nos. 8,087,679 B1 and 8,167,323 B1, each of the carts has a caster wheel configuration essentially similar to that illustrated in the side elevation view of FIG. 5, i.e., the lowermost edge of the depending flange 120 is spaced above the underlying surface by some small fraction of an inch, more or less, when all four wheels 130a, 130b, 136a, and 136b are resting upon that surface.

Any of the carts described herein may be moved or rolled on their wheels with their platforms remaining clear of the underlying surface. There is no need to tilt the cart rearward and balance the cart and load thereon to move the cart and its contents, as is the case with most conventional carts.

The very low platform provides the lowest possible center of gravity for the cart and its contents, thereby greatly increasing stability. Stability is further enhanced by the longitudinally and forwardly disposed caster wheels extending from the forward corners of the platform. Accordingly, the handcart in any of its various embodiments provides greatly enhanced safety and security for the user of the cart, particularly when it is used to carry potentially hazardous objects such as cylinders of pressurized gas for welding or other purposes.

It is to be understood that the present invention is not limited to the embodiments described above, but encompasses any and all embodiments within the scope of the following claims.

I claim:

1. A handcart, comprising:
   a platform having a rear portion, a forward portion, peripheral side edges, a left front corner, and a right front corner;
   a superstructure extending upwardly from the platform;
   a rear axle extending laterally across the superstructure and above at least the forward portion of the platform;
   directionally fixed rear wheels extending from the rear axle, the rear wheels being disposed laterally outward from the platform, the rear wheels having a first diameter;
   left and right straight lower portions extending from the left front and right frame members of the super structure, respectively, each of the lower portions having a distal end;
   caster wheel depending from the distal end of each of the frame members, the caster wheels being of a second diameter, wherein the second diameter wheels are less than the first diameter wheels; and left and right gusset plates, each of the gusset plates having a proximal end and a distal end, each proximal end being secured to a respective peripheral side edge of the platform and each distal end being secured to the lower portions of the left front and right frame members of the super structure, wherein each caster wheel is disposed longitudinally outward from the left front and right front corners of the platform.

2. The handcart according to claim 1, wherein the left and right gusset plates constitute the sole attachment of the lower portions of the left front and right frame members of the super structure to the platform.

3. The handcart according to claim 1, wherein the left and right gusset plates are welded to a respective peripheral side edge of the platform.

4. The handcart according to claim 1, wherein the left and right gusset plates form an acute angle with the lower portions of the left front and right frame members of the super structure.

* * * * *